United States Patent
Veneshetty

(10) Patent No.: US 10,620,688 B2
(45) Date of Patent: Apr. 14, 2020

(54) SPATIAL ORIENTATION CONTROL SYSTEM

(71) Applicant: Caterpillar Inc., Peoria, IL (US)

(72) Inventor: Arjun Veneshetty, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 122 days.

(21) Appl. No.: 15/936,963

(22) Filed: Mar. 27, 2018

(65) Prior Publication Data

US 2019/0302704 A1   Oct. 3, 2019

(51) Int. Cl.
| | |
|---|---|
| *H01H 35/00* | (2006.01) |
| *H01H 83/00* | (2006.01) |
| *G06F 1/3234* | (2019.01) |
| *G05B 1/01* | (2006.01) |
| *H01M 10/42* | (2006.01) |
| *G04G 17/08* | (2006.01) |
| *G06F 1/32* | (2019.01) |

(52) U.S. Cl.
CPC ............. *G06F 1/325* (2013.01); *G04G 17/08* (2013.01); *G05B 1/01* (2013.01); *G06F 1/32* (2013.01); *H01M 10/4257* (2013.01); *Y02D 10/171* (2018.01)

(58) Field of Classification Search
CPC ... H01M 10/4257; G04G 17/00; G04G 17/08; G06F 1/32; G06F 1/3203; G06F 1/3206; G06F 1/3231; G06F 1/325; Y02D 10/171; G05B 1/01
See application file for complete search history.

(56) References Cited

U.S. PATENT DOCUMENTS

| | | | |
|---|---|---|---|
| 6,271,605 B1 | 8/2001 | Carkner et al. | |
| 7,016,705 B2 | 3/2006 | Bahl et al. | |
| 8,665,214 B2 | 3/2014 | Forutanpour et al. | |
| 8,886,252 B2* | 11/2014 | Luke | H04M 1/6041 455/550.1 |
| 2007/0298751 A1* | 12/2007 | Wulff | G06F 1/1626 455/343.1 |
| 2013/0103960 A1 | 4/2013 | Alberth et al. | |
| 2013/0346762 A1 | 12/2013 | Hodges et al. | |
| 2014/0170694 A1* | 6/2014 | Vandersleen | G01N 33/5091 435/29 |
| 2015/0092520 A1* | 4/2015 | Robison | G04G 21/02 368/9 |
| 2019/0027791 A1* | 1/2019 | Begliarov | H01M 10/4257 |

* cited by examiner

*Primary Examiner* — Hal Kaplan
*Assistant Examiner* — Rasem Mourad

(57) ABSTRACT

An electronic device includes a housing having a battery installed within. A spatial orientation detection unit installed within the housing generates signals indicative of spatial orientation of the housing. The electronic device further includes a timer circuit, and a controller. The controller is communicably coupled with the battery, the spatial orientation detection unit, and the timer circuit. The controller periodically receives signals indicative of spatial orientation of the housing through the spatial orientation detection unit. The controller periodically determines spatial orientation of the housing based on the received signals. The controller determines whether spatial orientation of the housing corresponds to particular spatial orientation profiles at particular periodic intervals, and switches on the electronic device accordingly for a pre-determined time period.

20 Claims, 6 Drawing Sheets

SPATIAL ORIENTATION CONTROL SYSTEM

TECHNICAL FIELD

The present disclosure relates to providing a virtual ON/OFF button for an electronic device. More specifically, the present disclosure relates to a series of steps to be performed in order to turn on the electronic device.

BACKGROUND

Electronic devices typically have a battery for supplying power for the electronic device's operation. Battery is installed with the electronic device at the time of manufacturing itself. In some instances, the electronic device may be installed within a machine at such a location, that it is not possible for a user to switch the electronic device ON/OFF using a physical button. In such cases, the electronic device may not include a physical ON/OFF button. Therefore, the electronic device needs to be in default switched ON state.

The electronic device may not start operation right after manufacturing. During the time the electronic device is not being used, the battery is still in operation. The battery of such a device typically has a defined work life. However, the non-operation time typically reduces the usable battery life for a user. The user may not get a full battery life for the electronic device and may have to spend unnecessary costs for replacing the battery more times than it would have been required if the user would be able to use the full battery life.

U.S. patent application 2015/0092520 describes a smartwatch which may power down most of the smart watch components to save power. To change modes, the watch may use a two-step method. The method for changing modes of the smartwatch includes detecting a movement of the smartwatch with a first sensor, such as an accelerometer, located in the smartwatch based on the movement indicating a command request. After the movement is detected, the smartwatch may power on a second sensor located in the smartwatch to detect a second event, such as an audio signal, with the second sensor. Finally, if the second sensor indicates a command request, then the method includes changing the mode the smartwatch. Based on either input provided to the smartwatch or a lack of input, the smartwatch can adapt a threshold at which the movement would trigger a command request.

SUMMARY

In an aspect of the present disclosure, an electronic device is provided. The electronic device includes a housing. The electronic device includes a battery installed within the housing such that the housing encloses the battery. The electronic device includes a spatial orientation detection unit installed within the housing. The spatial orientation detection unit generates signals indicative of spatial orientation of the housing. The electronic device includes a timer circuit, and a controller. The controller is communicably coupled to the battery, the spatial orientation detection unit, and the timer circuit. The controller receives a first signal indicative of spatial orientation of the housing from the spatial orientation detection unit. The controller determines a first spatial orientation of the housing based on the received first signal. The controller compares the first spatial orientation of the housing to a first spatial orientation profile. The controller receives a first time signal indicative of lapse of a first time period through the timer circuit after the comparison, if the first spatial orientation of the housing corresponds to the first spatial orientation profile. The controller receives a second signal indicative of spatial orientation of the housing from the spatial orientation detection unit, after receiving the first time signal. The controller determines a second spatial orientation of the housing based on the received second signal. The controller compares the second spatial orientation of the housing to a second spatial orientation profile. The controller receives a second time signal indicative of lapse of a second time period through the timer circuit after the comparison, if the second spatial orientation of the housing corresponds to the second spatial orientation profile. The controller switches on the electronic device, if the housing maintains the spatial orientation corresponding to the second spatial orientation profile after lapse of the second time period.

In another aspect of the present disclosure, a method of assembling an electronic device is provided. The method includes providing a housing. The method includes installing a battery within the housing. The method includes installing a spatial orientation detection unit within the housing. The spatial orientation detection unit generates signals indicative of spatial orientation of the housing. The method includes installing a timer circuit within the housing. The method includes installing a controller communicably coupled with the battery, the spatial orientation detection unit, and the timer circuit. The controller receives a first signal indicative of spatial orientation of the housing from the spatial orientation detection unit. The controller determines a first spatial orientation of the housing based on the received first signal. The controller compares the first spatial orientation of the housing to a first spatial orientation profile. The controller receives a first time signal indicative of lapse of a first time period through the timer circuit, if the first spatial orientation of the housing corresponds to the first spatial orientation profile. The controller receives a second signal indicative of spatial orientation of the housing from the spatial orientation detection unit, after receiving the first time signal. The controller determines a second spatial orientation of the housing based on the received second signal. The controller compares the second spatial orientation of the housing to a second spatial orientation profile. The controller receives a second time signal indicative of lapse of a second time period through the timer circuit after the comparison, if the second spatial orientation of the housing corresponds to the second spatial orientation profile. The controller switches on the electronic device, if the housing maintains the spatial orientation corresponding to the second spatial orientation profile after lapse of the second time period.

Other features and aspects of this disclosure will be apparent from the following description and the accompanying drawings.

DETAILED DESCRIPTION

Figure 1:
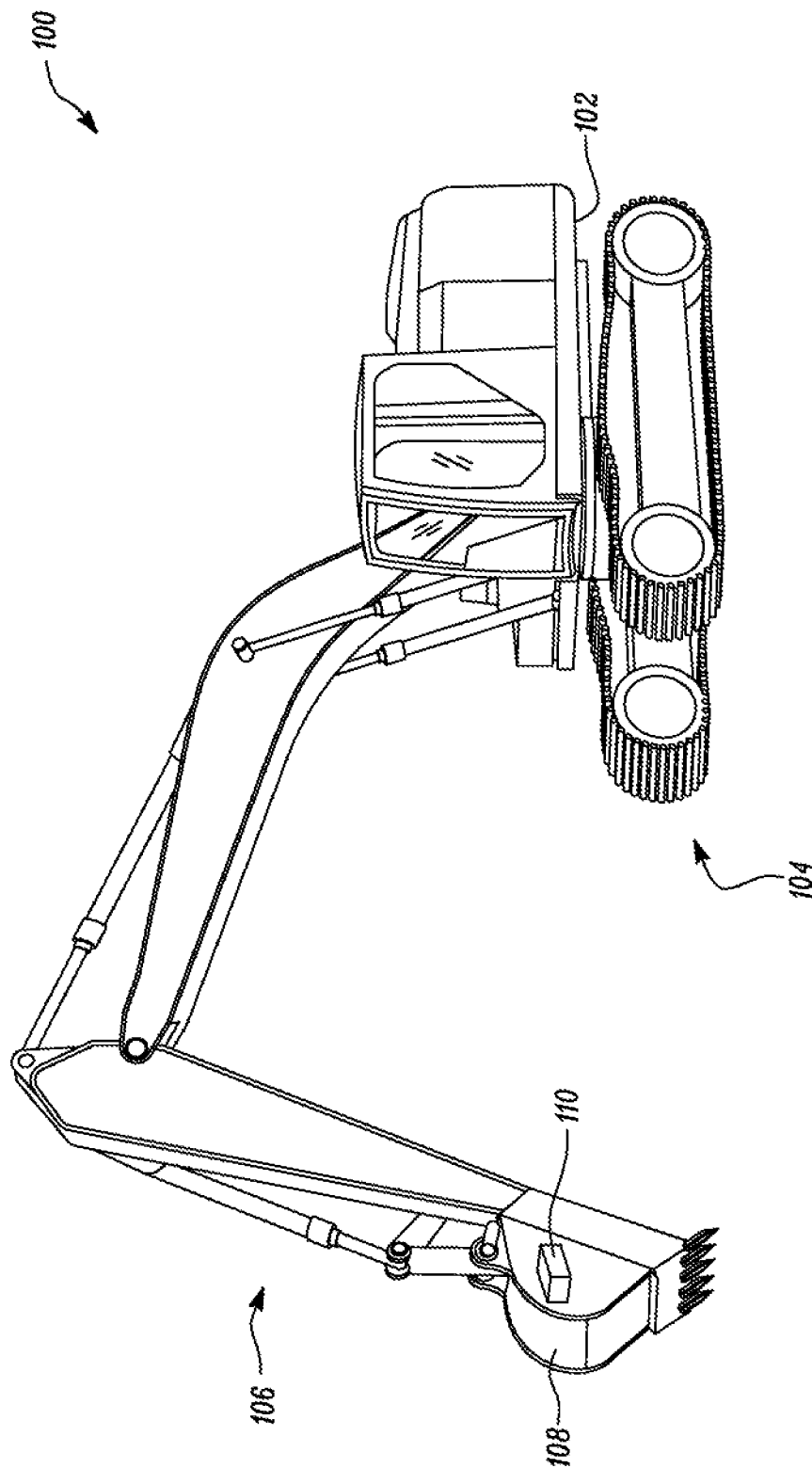
FIG. 1 shows a machine having an electronic device, according to an aspect of the present disclosure.

Wherever possible, the same reference numbers will be used throughout the drawings to refer to same or like parts. FIG. 1 shows a machine 100 illustrated as an excavator. Although, the machine 100 is illustrated as an excavator, it should be contemplated that the machine 100 may be any machine which may be suitable for application with various aspects of the present disclosure. The machine 100 may be used to perform various activities related to a worksite (not shown). The machine 100 includes a body 102 supported over a track assembly 104. The machine 100 has an implement assembly 106 having a bucket 108 at an end to manipulate or move soil etc. on the worksite. An electronic device 110 is coupled to the bucket 108.

The electronic device 110 may be used to record various motion parameters of the bucket 108, parameters of soil with which the machine 100 is working such as moisture, humidity etc. The electronic device 110 may also be used to sense, or record any other suitable parameter associated with the implement assembly 106 of the machine 100. The electronic device 110 may also be used with an engine assembly (not shown), the track assembly (104), a transmission system or any other such parts and components of the machine 100. In another aspect of the present disclosure, the electronic device 110 may also be used independently of the machine 100. The electronic device may be a smart camera, a sensing device, or any other type of an electronic device which does not have a manual ON/OFF button.

Figure 2:
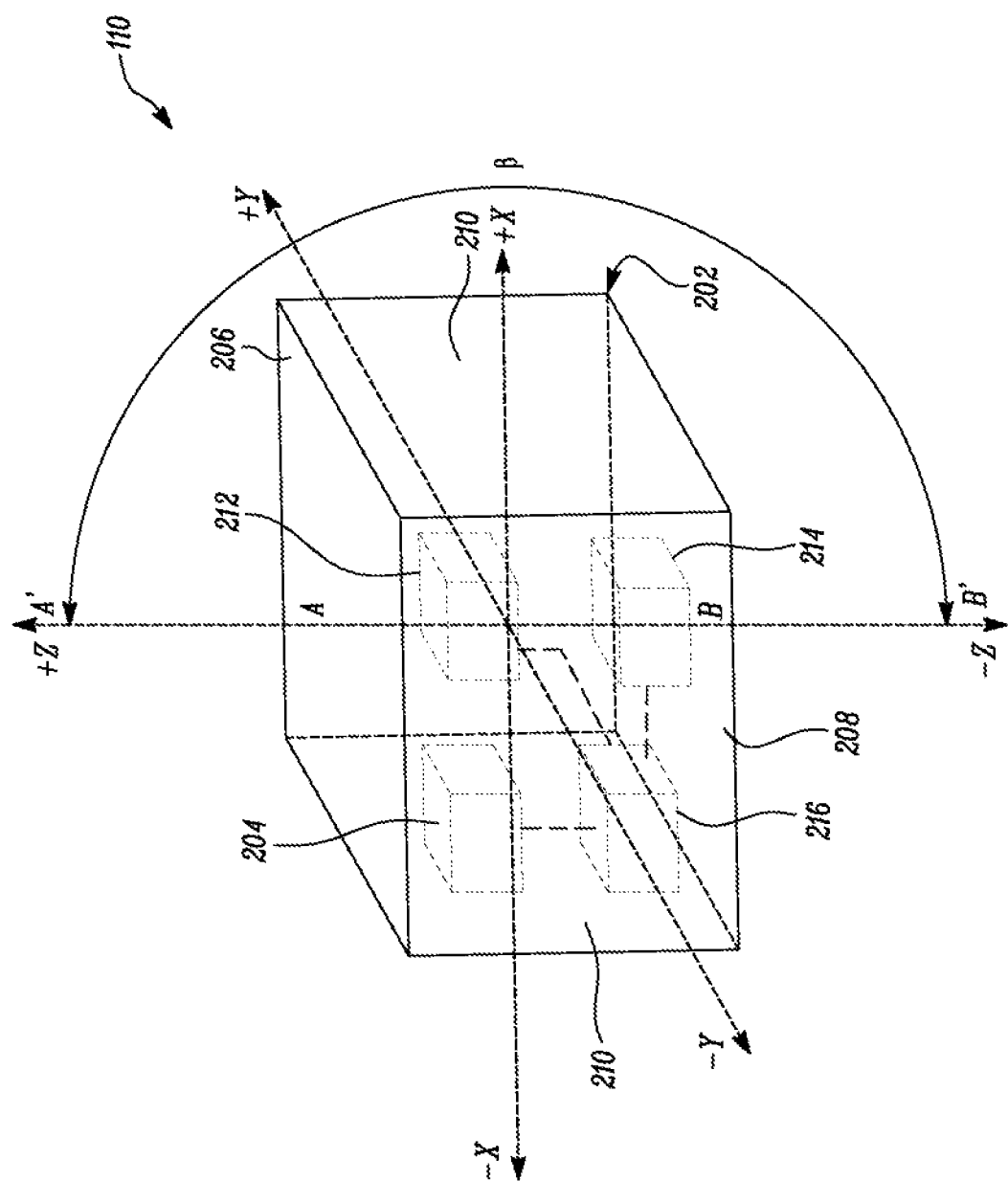
FIG. 2 shows the electronic device in a first spatial orientation profile, according to an aspect of the present disclosure.

FIG. 2 schematically illustrates the electronic device 110. The electronic device 110 includes a housing 202, and a battery 204 installed within the housing 202. The housing 202 encloses the battery 204 such that the battery 204 may not be accessible from outside the electronic device 110. The housing 202 includes a top surface 206, a bottom surface 208, and a plurality of side walls 210 coupling the top surface 206 and the bottom surface 208. The top surface 206, the bottom surface 208, and the side walls 210 may be all planar surfaces together defining the housing 202. One or more of the top surface 206, the bottom surface 208, or the side walls 210 may also have a curved structure. The present disclosure is not limited by shape of the housing 202 in any manner.

The electronic device 110 includes a spatial orientation detection unit 212 installed within the housing 202. The spatial orientation detection unit 212 generates signals indicative of spatial orientation of the housing 202. Spatial orientation refers to an orientation of the housing 202 of the electronic device 110 in three-dimensional space. The spatial orientation detection unit 212 may generate the signals indicative of the spatial orientation of the housing 202 periodically. The spatial orientation detection unit 212 may be an accelerometer, a gyroscope, a Global Positioning System (GPS), a Geographic Information System (GIS), an imaging device, a camera or any other suitable device which may accurately detect the spatial orientation of the housing 202 and generates the signals indicative of the same.

A cartesian coordinate system is defined around the electronic device 110 such that an X-axis and a Y-axis together define an X-Y plane passing through the top surface 206. A Z-axis is orthogonal to the X-Y plane. All the three axes are defined such that a positive and a negative direction is defined for each of the axes. The X-axis comprises of a positive X-axis and a negative X-axis, the Y-axis comprises of a positive Y-axis and a negative Y-axis, and the Z-axis comprises of a positive Z-axis and a negative Z-axis.

The top surface 206 defines a top surface normal A-A' perpendicular to the top surface 206. The top surface normal A-A' extends away from the top surface 206. The top surface normal A-A' defines a first angle α (shown in FIG. 3) with the positive Z-axis. Similarly, the bottom surface 208 defines a bottom surface normal B-B' perpendicular to the bottom surface 208. The bottom surface normal B-B' extends away from the bottom surface 208. The bottom surface normal B-B' defines a second angle β with the positive Z-axis (shown in FIG. 2).

The electronic device 110 is illustrated in a first spatial orientation profile in FIG. 2. The first spatial orientation profile may be defined by a range of values for the first angle α and the second angle β. When the electronic device 110 is in the first spatial orientation profile, the first angle α has a value of zero degrees. A tolerance range of 20 degrees on either side may be defined for more accurate measurements, and a range of values for the first angle α may be −20 degrees to +20 degrees. At the same time, the second angle β has a value of 180 degrees. A tolerance range of 20 degrees on either side may be defined for more accurate measurements, and a range of values for the second angle β may be 160 degrees to 200 degrees.

Figure 3:
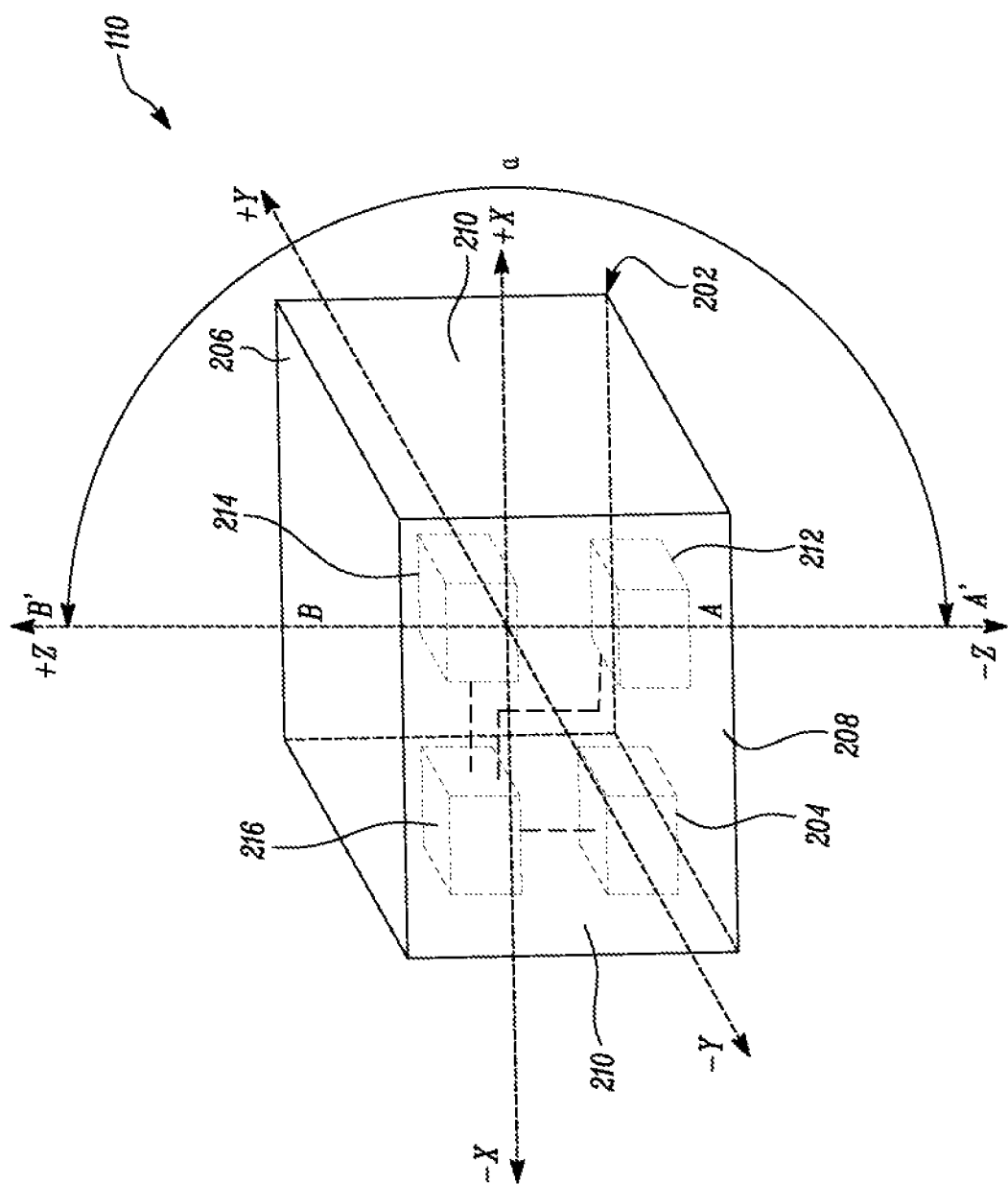
FIG. 3 shows the electronic device in a second spatial orientation profile, according to an aspect of the present disclosure.

FIG. 3 illustrates the electronic device 110 in the second spatial orientation profile. The electronic device 110 in second spatial orientation profile is upside down corresponding to the first spatial orientation profile. The top surface 206 and the bottom surface 208 interchange positions, and the second spatial orientation profile may similarly be defined through the first angle α and the second angle β. When the electronic device 110 is in the second spatial orientation profile, the first angle α has a value of 180 degrees. A tolerance range of 20 degrees on either side may be defined for more accurate measurements, and a range of values for the first angle α may be 160 degrees to 200 degrees. At the same time, the second angle β has a value of 0 degrees. A tolerance range of 20 degrees on either side may be defined for more accurate measurements, and a range of values for the second angle β may be −20 degrees to +20 degrees.

The electronic device 110 further includes a timer circuit 214. The timer circuit 214 may be configured to keep track of time elapsed since an instant of time. The timer circuit 214 may generate signals indicative of lapse of a predetermined time period. The timer circuit 214 may include suitable circuitry to keep track of time such as a clock. The electronic device 110 further includes a controller 216. The controller 216 may be a single controller or multiple controllers working together to perform a variety of tasks. The controller 216 may embody a single microprocessor or multiple microprocessors, field programmable gate arrays (FPGAs), digital signal processors (DSPs), etc. Numerous commercially available microprocessors can be configured to perform the functions of the controller 216.

The controller 216 is communicably coupled to the battery 204, the spatial orientation detection unit 212, and the timer circuit 214. The controller 216 may receive signals indicative of the spatial orientation of the housing 202 generated by the spatial orientation detection unit 212. The controller 216 may be adequately equipped to determine spatial orientation of the housing 202 based on the received signals from the spatial orientation detection unit 212. The controller 216 may also receive the signals generated by the timer circuit 214. In an embodiment, the controller 216 remains in a minimum power consumption mode (or a sleep mode). When the controller 216 receives signals from the timer circuit 214, the controller 216 receives the signals from the spatial orientation detection unit 212, and again returns to the minimum power consumption mode. This allows the controller 216 to use minimum battery power and prolong the battery life. The controller 216 may be communicably coupled to the battery 204 such that the controller 216 may switch the electronic device 110 ON/OFF as per application requirements. The controller 216 may be programmed to switch the electronic device 110 ON/OFF after determining that the housing 202 has undergone a pre-determined sequence of physical motions. In the context of the present disclosure, switching ON the electronic device 110 refers to switching ON the electronic device 110 to operate normally, and not under minimum power consumption mode. The controller 216 may control the power supply from the battery 204 such that various components of the electronic device 110 receive adequate power for carrying out respective functions. Similarly, switching OFF the electronic device 110 refers to the controller 216 returning to the minimum power consumption mode of operation.

Figure 4:
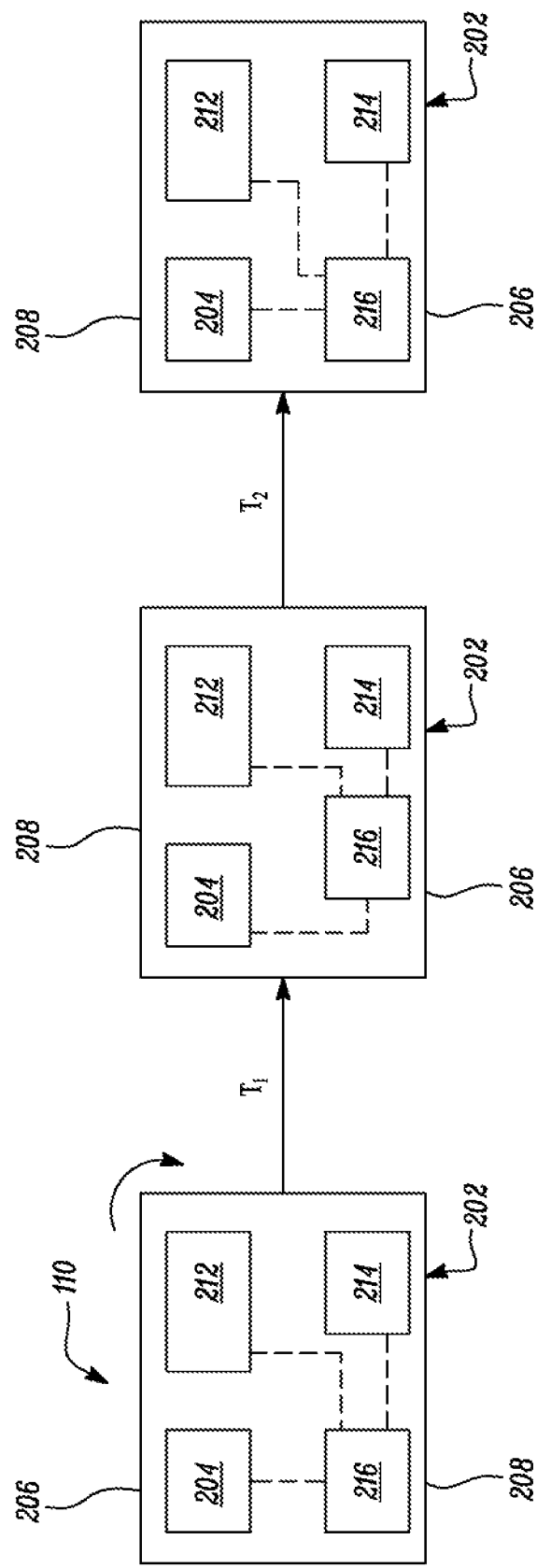
FIG. 4 shows a sequence of motions for the electronic device to temporarily switch ON the electronic device, according to an aspect of the present disclosure.

FIG. 4 illustrates such a sequence of motions for the housing 202 of the electronic device 110 for temporarily switching ON the electronic device 110. Typically, after installation the battery 204 of the electronic device 110 may only supply power to the timer circuit 214, and may supply only minimum possible power required to the controller 216. At first, the controller 216 receives a first signal indicative of spatial orientation of the housing 202 from the spatial orientation detection unit 212. The controller 216 determines a first spatial orientation of the housing 202 based on the received first signal. The controller 216 compares the first spatial orientation of the housing 202 to the first spatial orientation profile. The first spatial orientation profile may be stored within a memory (not shown) associated with the controller 216. If the spatial orientation of the housing 202 does not correspond to the first spatial orientation profile, the controller 216 checks the spatial orientation of the housing 202 again after lapse of a pre-determined amount of time by receiving another signal from the spatial orientation detection unit 212. The controller 216 periodically checks whether orientation of the housing 202 corresponds to the first spatial orientation profile. If the spatial orientation of the housing 202 corresponds to the first spatial orientation profile, the controller 216 proceeds with further steps.

The controller 216 then receives a first time signal indicative of lapse of a first time period $T_1$ through the timer circuit 214. The first time period $T_1$ may be a pre-determined time period which may be pre-programmed with the controller 216. In an embodiment, value of the first time period $T_1$ may be selected from a range of 5 to 15 seconds. In another embodiment, value of the first time period $T_1$ may be selected from a range of 8 to 10 seconds. It should be contemplated that the present disclosure is not limited by value of the first time period $T_1$ in any manner. Any suitable value of the first time period $T_1$ may be pre-programmed with the controller 216 as per application requirements of the electronic device 110.

The controller 216 receives a second signal indicative of spatial orientation of the housing 202 from the spatial orientation detection unit 212, after receiving the first time signal. The controller 216 determines a second spatial orientation of the housing 202 based on the received second signal. The controller 216 compares the second spatial orientation of the housing 202 to the second spatial orientation profile. The second spatial orientation profile may be stored within the memory associated with the controller 216. If the spatial orientation of the housing 202 does not correspond to the second spatial orientation profile, the controller 216 checks the spatial orientation of the housing 202 again after lapse of a pre-determined amount of time by receiving another signal from the spatial orientation detection unit 212. The controller 216 again starts with determining sequence of motion from first step, i.e. whether the orientation of the housing 202 corresponds to the first spatial orientation profile and so on. However, if the spatial orientation of the housing 202 corresponds to the second spatial orientation profile, the controller 216 proceeds with further steps. The controller 216 receives a second time signal indicative of lapse of a second time period $T_2$ through the timer circuit 214 after the comparison. The second time period $T_2$ may be a pre-determined time period which may be pre-programmed with the controller 216. In an embodiment, value of the second time period $T_2$ may be selected from a range of 5 to 15 seconds. In another embodiment, value of the second time period $T_2$ may be selected from a range of 8 to 10 seconds. It should be contemplated that the present disclosure is not limited by value of the second time period $T_2$ in any manner. Any suitable value of the second time period $T_2$ may be pre-programmed with the controller 216 as per application requirements of the electronic device 110.

The controller 216 further receives another signal indicative of spatial orientation of the housing 202 after lapse of the second time period $T_2$. If the housing 202 maintains the spatial orientation corresponding to the second spatial orientation profile after lapse of the second time period $T_2$, the controller 216 temporarily switches ON the electronic device 110 for a pre-determined time period. In the context of the present disclosure, temporarily switching ON the electronic device 110 refers to the controller 216 performing regular tasks, and not operating under minimum power consumption mode for the pre-determined time period. After the pre-determined time period is lapsed, the controller 216 returns back to the minimum power consumption mode. In an embodiment, the time period may be selected from a range of 25 to 35 seconds. In another embodiment, the time period may be 30 seconds.

Figure 5:
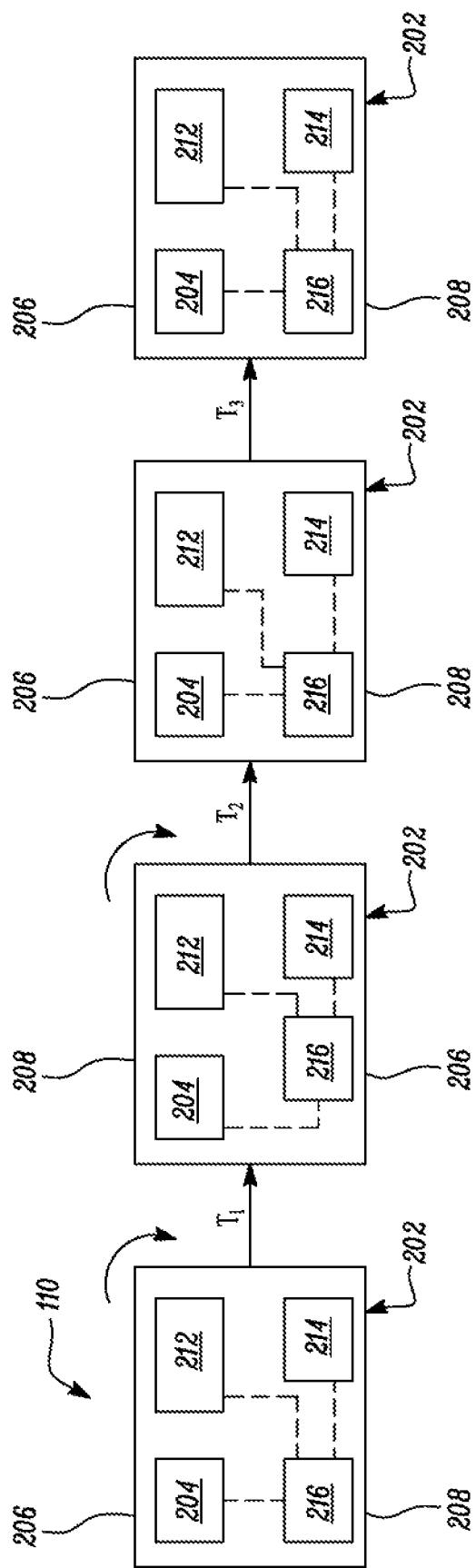
FIG. 5 shows a sequence of motions for the electronic device to permanently switch ON the electronic device, according to an aspect of the present disclosure.
Figure 6:
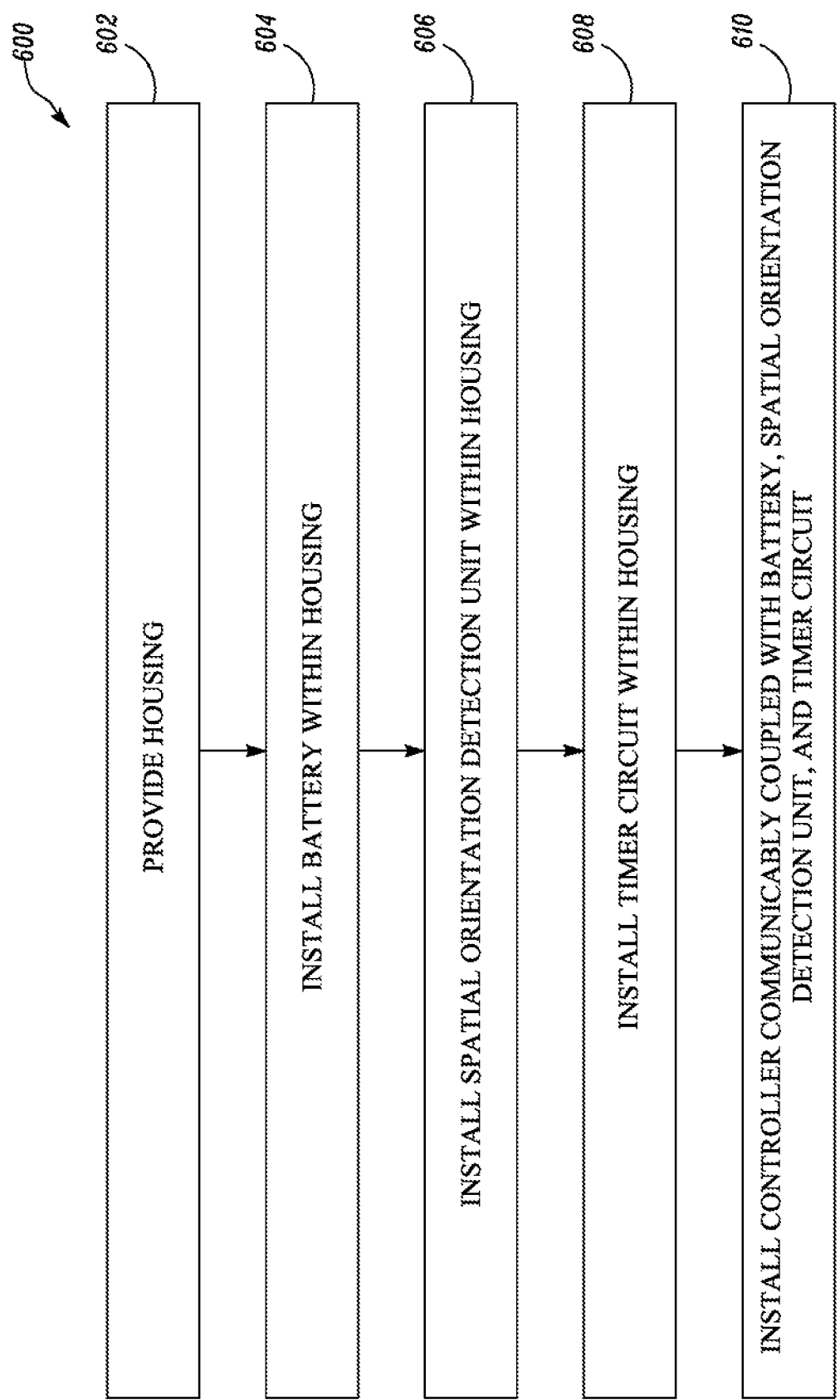
FIG. 6 shows a method of assembling the electronic device through a flow chart, according to another aspect of the present disclosure.

FIG. 5 illustrates another such sequence of motions for the housing 202 of the electronic device 110 for permanently switching ON the electronic device 110. For the permanent switching ON sequence, initially, the controller 216 waits for a certain period of time. This waiting period helps the controller 216 in eliminating any interference with temporary switching ON sequence. In an embodiment, this waiting period may be 1 minute. Some initial steps of this sequence may be similar to the temporary switching ON sequence. The controller 216 receives the first signal indicative of spatial orientation of the housing 202 from the spatial orientation detection unit 212. The controller 216 determines the first spatial orientation of the housing 202 based on the received first signal. The controller 216 compares the first spatial orientation of the housing 202 to the first spatial orientation profile. If the spatial orientation of the housing 202 does not correspond to the first spatial orientation profile, the controller 216 checks the spatial orientation of the housing 202 again after lapse of a pre-determined amount of time by receiving another signal from the spatial orientation detection unit 212. If the spatial orientation of the housing 202 corresponds to the first spatial orientation profile, the controller 216 proceeds with further steps.

The controller 216 then receives the first time signal indicative of lapse of the first time period $T_1$ through the timer circuit 214. The controller 216 receives the second signal indicative of spatial orientation of the housing 202 from the spatial orientation detection unit 212, after receiving the first time signal. The controller 216 determines the second spatial orientation of the housing 202 based on the received second signal. The controller 216 compares the second spatial orientation of the housing 202 to the second spatial orientation profile. If the spatial orientation of the housing 202 does not correspond to the second spatial orientation profile, the controller 216 checks the spatial orientation of the housing 202 again after lapse of a pre-determined amount of time by receiving another signal from the spatial orientation detection unit 212. If the spatial orientation of the housing 202 corresponds to the second spatial orientation profile, the controller 216 receives the second time signal indicative of lapse of the second time-period $T_2$ through the timer circuit 214 after the comparison.

After receiving the second time signal, the controller 216 receives a third signal indicative of spatial orientation of the housing 202 from the spatial orientation detection unit 212. The controller 216 determines a third spatial orientation of the housing 202 based on the received third signal. The controller 216 compares the third spatial orientation of the housing 202 to the first spatial orientation profile. If the third spatial orientation does not correspond to the first spatial orientation profile, the controller 216 checks the spatial orientation of the housing 202 again after lapse of a pre-determined amount of time by receiving another signal from the spatial orientation detection unit 212. The controller 216 again starts with determining sequence of motion from first step, i.e. whether the orientation of the housing 202 corresponds to the first spatial orientation profile and so on.

If the third spatial orientation corresponds to the first spatial orientation profile, the controller 216 receives a third time signal indicative of lapse of a third time period $T_3$ through the timer circuit 214. The third time period $T_3$ may be a pre-determined time period which may be pre-programmed with the controller 216. In an embodiment, value of the third time period $T_3$ may be selected from a range of 5 to 15 seconds. In another embodiment, value of the third time period $T_3$ may be selected from a range of 8 to 10 seconds. It should be contemplated that the present disclosure is not limited by value of the third time period $T_3$ in any manner. Any suitable value of the third time period $T_3$ may be pre-programmed with the controller 216 as per application requirements of the electronic device 110. If the housing 202 maintains the spatial orientation corresponding to the first spatial orientation profile after lapse of the third time period $T_3$, the controller 216 switches on the electronic device 110 permanently.

INDUSTRIAL APPLICABILITY

The present disclosure provides a method 600 of assembling the electronic device 110. At step 602, the method 600 includes providing the housing 202. At step 604, the method 600 includes installing the battery 204 within the housing 202 such that the housing 202 encloses the battery 204, and the battery 204 is not accessible to a user from outside the housing 202. At step 606, the method 600 includes installing the spatial orientation detection unit 212 within the housing 202. The spatial orientation detection unit 212 generates signals indicative of spatial orientation of the housing 202.

At step 608 the method 600 includes installing the timer circuit 214 within the housing 202. The timer circuit 214 keeps track of time lapsed and generates signals indicative of the same.

At step 610, the method 600 includes installing the controller 216 such that the controller 216 is communicably coupled to the battery 204, the timer circuit 214, and the spatial orientation detection unit 212. The controller 216 is pre-programmed to detect pre-determined sequence of motions for the housing 202 to switch ON the electronic device 110 temporarily, or permanently as described with help of FIGS. 4 and 5. It should be contemplated that the controller 216 may also be programmed to switch OFF the electronic device 110 after detecting another sequence of motion which may be pre-programmed into the memory of the controller 216.

The controller 216 is pre-programmed to detect sequence of motion of the housing 202 to switch ON the electronic device 110 temporarily or permanently. Temporary switching ON the electronic device 110 may be helpful for a technician, or a service personnel for testing the electronic device 110 during or after manufacturing. Further, permanently switching ON the electronic device 110 may allow a user to switch ON the electronic device 110 easily without requiring a physical ON/OFF button. Also, as the battery 204 starts providing normal amount of power to various components right before the electronic device 110 starts operation, the user may get maximum possible battery life. This may provide cost savings for replacing the battery 204.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An electronic device comprising:
   a housing;
   a battery installed within the housing such that the housing encloses the battery;
   a spatial orientation detection circuit installed within the housing, wherein the spatial orientation detection circuit is configured to generate signals indicative of spatial orientation of the housing;
   a timer circuit; and
   a controller communicably coupled to the battery, the spatial orientation detection circuit, and the timer circuit, wherein the controller is configured to:
      receive a first signal indicative of spatial orientation of the housing from the spatial orientation detection circuit;
      determine a first spatial orientation of the housing based on the received first signal;
      compare the first spatial orientation of the housing to a first spatial orientation profile;
      receive a first time signal indicative of lapse of a first time period through the timer circuit after the comparison, if the first spatial orientation of the housing corresponds to the first spatial orientation profile;
      receive a second signal indicative of spatial orientation of the housing from the spatial orientation detection circuit, after receiving the first time signal;
      determine a second spatial orientation of the housing based on the received second signal;

compare the second spatial orientation of the housing to a second spatial orientation profile;

receive a second time signal indicative of lapse of a second time period through the timer circuit after the comparison, if the second spatial orientation of the housing corresponds to the second spatial orientation profile; and switch on the electronic device, if the housing maintains the spatial orientation corresponding to the second spatial orientation profile after lapse of the second time period.

2. The electronic device of claim 1, wherein the electronic device is switched on for a pre-determined time period.

3. The electronic device of claim 2, wherein the pre-determined time period has a value in a range of 25 to 35 seconds.

4. The electronic device of claim 1, wherein the housing includes:
a top surface defining a top surface normal perpendicular to the top surface, wherein the top surface normal defines a first angle with a positive Z-axis;
a bottom surface disposed spaced apart from the top surface, and defining a bottom surface normal perpendicular to the bottom surface, wherein the bottom surface normal defines a second angle with the positive Z-axis; and
a plurality of side walls defined between the top surface and the bottom surface.

5. The electronic device of claim 4, wherein the first spatial orientation profile corresponds to a spatial orientation of the electronic device such that the first angle has a value in range of −20 degrees to 20 degrees, and the second angle is in a range of 160 degrees to 200 degrees.

6. The electronic device of claim 4, wherein the second spatial orientation profile corresponds to a spatial orientation of the electronic device such that the second angle has a value in range of −20 degrees to 20 degrees, and the first angle is in a range of 160 degrees to 200 degrees.

7. The electronic device of claim 1, wherein the first time period has a value in a range of 5 to 15 seconds.

8. The electronic device of claim 1, wherein the first time period has a value in a range of 8 to 10 seconds.

9. The electronic device of claim 1, wherein the second time period has a value in a range of 5 to 15 seconds.

10. The electronic device of claim 1, wherein the second time period has a value in a range of 8 to 10 seconds.

11. The electronic device of claim 1, wherein the controller is further configured to:
receive a third signal indicative of spatial orientation of the housing from the spatial orientation detection circuit, after receiving the second time signal;
determine a third spatial orientation of the housing based on the received third signal;
compare the third spatial orientation of the housing to the first spatial orientation profile;
receive a third time signal indicative of lapse of a third time period through the timer circuit, if the third spatial orientation of the housing corresponds to the first spatial orientation profile;
switch on the electronic device permanently, if the housing maintains the spatial orientation corresponding to the first spatial orientation profile after lapse of the third time period.

12. The electronic device of claim 11, wherein the third time period has a value in a range of 5 to 15 seconds.

13. The electronic device of claim 11, wherein the third time period has a value in a range of 8 to 10 seconds.

14. A method of assembling an electronic device comprising:
providing a housing;
installing a battery within the housing;
installing a spatial orientation detection circuit within the housing, wherein the spatial orientation detection circuit is configured to generate signals indicative of spatial orientation of the housing;
installing a timer circuit within the housing; and
installing a controller communicably coupled with the battery, the spatial orientation detection circuit, and the timer circuit such that the controller is configured to:
receive a first signal indicative of spatial orientation of the housing from the spatial orientation detection circuit;
determine a first spatial orientation of the housing based on the received first signal;
compare the first spatial orientation of the housing to a first spatial orientation profile;
receive a first time signal indicative of lapse of a first time period through the timer circuit, if the first spatial orientation of the housing corresponds to the first spatial orientation profile;
receive a second signal indicative of spatial orientation of the housing from the spatial orientation detection circuit, after receiving the first time signal;
determine a second spatial orientation of the housing based on the received second signal;
compare the second spatial orientation of the housing to a second spatial orientation profile;
receive a second time signal indicative of lapse of a second time period through the timer circuit after the comparison, if the second spatial orientation of the housing corresponds to the second spatial orientation profile; and
switch on the electronic device, if the housing maintains the spatial orientation corresponding to the second spatial orientation profile after lapse of the second time period.

15. The method of claim 14, wherein the electronic device is switched on for a pre-determined time period.

16. The method of claim 15, wherein the pre-determined time period has a value in a range of 25 to 35 seconds.

17. The method of claim 14, wherein the first time period has a value in a range of 5 to 15 seconds.

18. The method of claim 14, wherein the second time period has a value in a range of 5 to 15 seconds.

19. The method of claim 14, wherein the controller is further configured to:
compare the second spatial orientation of the housing to the first spatial orientation profile, after receiving the second time signal;
receive a third time signal indicative of lapse of a third time period through the timer circuit, if the second spatial orientation of the housing corresponds to the first spatial orientation profile;
receive a third signal indicative of spatial orientation of the housing from the spatial orientation detection circuit;
determine a third spatial orientation of the housing based on the received third signal;
compare the third spatial orientation of the housing to the first spatial orientation profile; and
switch on the electronic device permanently, if the third spatial orientation of the housing corresponds to the first spatial orientation profile based on the comparison.

20. The method of claim 19, wherein the third time period has a value in a range of 5 to 15 seconds.

\* \* \* \* \*